US 9,146,928 B1

(12) United States Patent
Noveck (10) Patent No.: US 9,146,928 B1
(45) Date of Patent: Sep. 29, 2015

(54) TECHNIQUES FOR STORING METADATA OF A FILESYSTEM IN PERSISTENT MEMORY (71) Applicant: EMC Corporation, Hopkinton, MA (US)

(72) Inventor: David B. Noveck, Lexington, MA (US)

(73) Assignee: EMC Corporation, Hopkinton, MA (US)

( * ) Notice: Subject to any disclaimer, the term of this patent is extended or adjusted under 35 U.S.C. 154(b) by 332 days.

(21) Appl. No.: 13/731,708

(22) Filed: Dec. 31, 2012

(51) Int. Cl.
G06F 17/30 (2006.01)

(52) U.S. Cl.
CPC .... *G06F 17/30088* (2013.01); *G06F 17/30067* (2013.01)

(58) Field of Classification Search
CPC .................. G06F 17/30088; G06F 17/30067
USPC .......... 707/640, 649, 822; 711/103, 104, 105, 711/208
See application file for complete search history.

(56) References Cited

U.S. PATENT DOCUMENTS

| 6,678,788 | B1 | 1/2004 | O'Connell | |
|---|---|---|---|---|
| 6,691,209 | B1 | 2/2004 | O'Connell | |
| 6,718,481 | B1 | 4/2004 | Fair | |
| 6,732,124 | B1 * | 5/2004 | Koseki et al. | 707/999.1 |
| 6,865,157 | B1 | 3/2005 | Scott et al. | |
| 7,219,260 | B1 | 5/2007 | de Forest et al. | |
| 7,546,323 | B1 | 6/2009 | Timmins et al. | |
| 7,627,779 | B2 | 12/2009 | Fair | |
| 7,730,090 | B2 | 6/2010 | Godbole | |
| 7,783,615 | B1 | 8/2010 | Compton et al. | |
| 7,818,302 | B2 | 10/2010 | Godbole | |
| 7,870,356 | B1 | 1/2011 | Veeraswamy et al. | |
| 7,900,088 | B1 | 3/2011 | Pawar et al. | |
| 8,392,370 | B1 * | 3/2013 | Whitney et al. | 707/640 |
| 8,661,068 | B1 * | 2/2014 | Seibel et al. | 707/825 |
| 2002/0083120 | A1 * | 6/2002 | Soltis | 709/200 |
| 2004/0107318 | A1 * | 6/2004 | Bono et al. | 711/118 |
| 2005/0065986 | A1 * | 3/2005 | Bixby et al. | 707/204 |
| 2009/0031072 | A1 * | 1/2009 | Sartore | 711/102 |
| 2009/0292861 | A1 * | 11/2009 | Kanevsky et al. | 711/103 |
| 2010/0205368 | A1 * | 8/2010 | Gregg et al. | 711/113 |
| 2010/0205421 | A1 * | 8/2010 | Campbell et al. | 713/2 |

(Continued)

OTHER PUBLICATIONS

Sairam Veeraswamy, "Accelerating File System Recovery by Storing File System Metadata on Fast Persistent Storage During File System Recovery", U.S. Appl. No. 13/538,104, filed Jun. 29, 2012.
Sairam Veeraswamy, et al., "Lightweight Metadata Sharing Protocol for Location Transparent File Access", U.S. Appl. No. 13/538,137, filed Jun. 29, 2012.

(Continued)

Primary Examiner — Cheryl Lewis
Assistant Examiner — Tiffany Thuy Bui
(74) Attorney, Agent, or Firm — BainwoodHuang (57) ABSTRACT A method is presented for operating a filesystem. The method includes (a) storing data of the filesystem in a data storage filesystem (DSFS) in block-addressable non-volatile storage and (b) storing metadata of the filesystem in a metadata filesystem (MDFS) separate from the DSFS, at least a portion of the metadata being stored in word-addressable memory (WAM) having a persistence feature. Several embodiments are described for achieving this, using, for example, only non-volatile WAM, while other embodiments are described using, for example, a combination of volatile WAM and persistence techniques, while yet other embodiments are described using, for example, a combination of persistence-enhanced WAM and data storage.

19 Claims, 4 Drawing Sheets

(56) References Cited

U.S. PATENT DOCUMENTS

| | | | |
|---|---|---|---|
| 2011/0099461 A1* | 4/2011 | Rajpal et al. | 714/807 |
| 2012/0239860 A1* | 9/2012 | Atkisson et al. | 711/103 |
| 2012/0290781 A1* | 11/2012 | Seo et al. | 711/104 |
| 2013/0080732 A1* | 3/2013 | Nellans et al. | 711/206 |
| 2013/0346668 A1* | 12/2013 | Floman et al. | 711/103 |
| 2014/0250155 A1* | 9/2014 | Chen et al. | 707/823 |

OTHER PUBLICATIONS

Walter C. Forrester, et al., "Just-in-Time Formatting of File System Metadata", U.S. Appl. No. 13/591,612, filed Aug. 22, 2012.

James Alan Kelley, et al., "Techniques for Securing a Centralized Metadata Distributed Filesystem", U.S. Appl. No. 13/731,858, filed Dec. 31, 2012.

\* cited by examiner

TECHNIQUES FOR STORING METADATA OF A FILESYSTEM IN PERSISTENT MEMORY

BACKGROUND

In a data storage system, data is typically stored in the context of a filesystem. In a filesystem structure, in addition to the data there is metadata which includes organizational information about the filesystem, such as directory structure, file creation and modification information, and the locations where blocks of files are actually stored. In a conventional data storage system, a unitary filesystem is utilized, in which both the data and metadata are stored on a disk or some other block-addressable persistent storage such as flash memory arranged as a solid state disk (SSD).

In some conventional data storage systems, the metadata is stored separately from the data on a separate medium. For example, since the metadata is much smaller than the data and it is accessed more frequently, a faster disk technology may be used to store the metadata. Along these lines, suppose that the data is stored on relatively cheap slowly-rotating magnetic rotating disks. In such a case, the metadata may be stored on a faster disk or on an SSD.

SUMMARY

The above-described conventional data storage systems may not be optimal. For example, any time such a system makes a change to the metadata, the system must read, modify, and write back an entire block from the disk (or SSD) on which the metadata is stored, even if only a single byte of data is being changed. However, many changes to metadata are actually quite small; for example, when the modification time of a file is changed, only the 4 or 8 bytes of data representing the modification time need be modified, rather than an entire block of 512 or 4,096 bytes. Unfortunately, by storing metadata on typical block-addressable data storage, merely modifying just a few bytes of data is not possible without reading and writing the entire block. This can significantly slow down the speed at which metadata can be modified and limit the speed at which data can be written to or read from a data storage system using a filesystem structure.

Thus, it would be desirable to store filesystem metadata on byte-addressable or word-addressable memory, rather than block-addressable data storage. However, since most memory is typically volatile, merely storing the filesystem metadata on memory would not work, because it would not persist across a system restart, such as due to a controlled shutdown or a system failure. An improved technique involves storing filesystem metadata on word-addressable memory having a persistence feature to allow for high speed access while also surviving system restarts.

Several embodiments of the improved technique are directed to a method of operating a filesystem. The method includes (a) storing data of the filesystem in a data storage filesystem (DSFS) in block-addressable non-volatile storage and (b) storing metadata of the filesystem in a metadata filesystem (MDFS) separate from the DSFS, at least a portion of the metadata being stored in word-addressable memory (WAM) having a persistence feature. Several specific embodiments are described for achieving this, using, for example, only non-volatile WAM, while other embodiments are described using, for example, a combination of volatile WAM and persistence techniques, while yet other embodiments are described using, for example, a combination of persistence-enhanced WAM and data storage.

Other embodiments are directed to a computerized apparatus and a computer program product for performing a method similar to that described above.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments are directed to techniques for storing filesystem metadata on word-addressable memory (WAM) having a persistence feature to allow for high speed access while also surviving system restarts.

Figure 1:
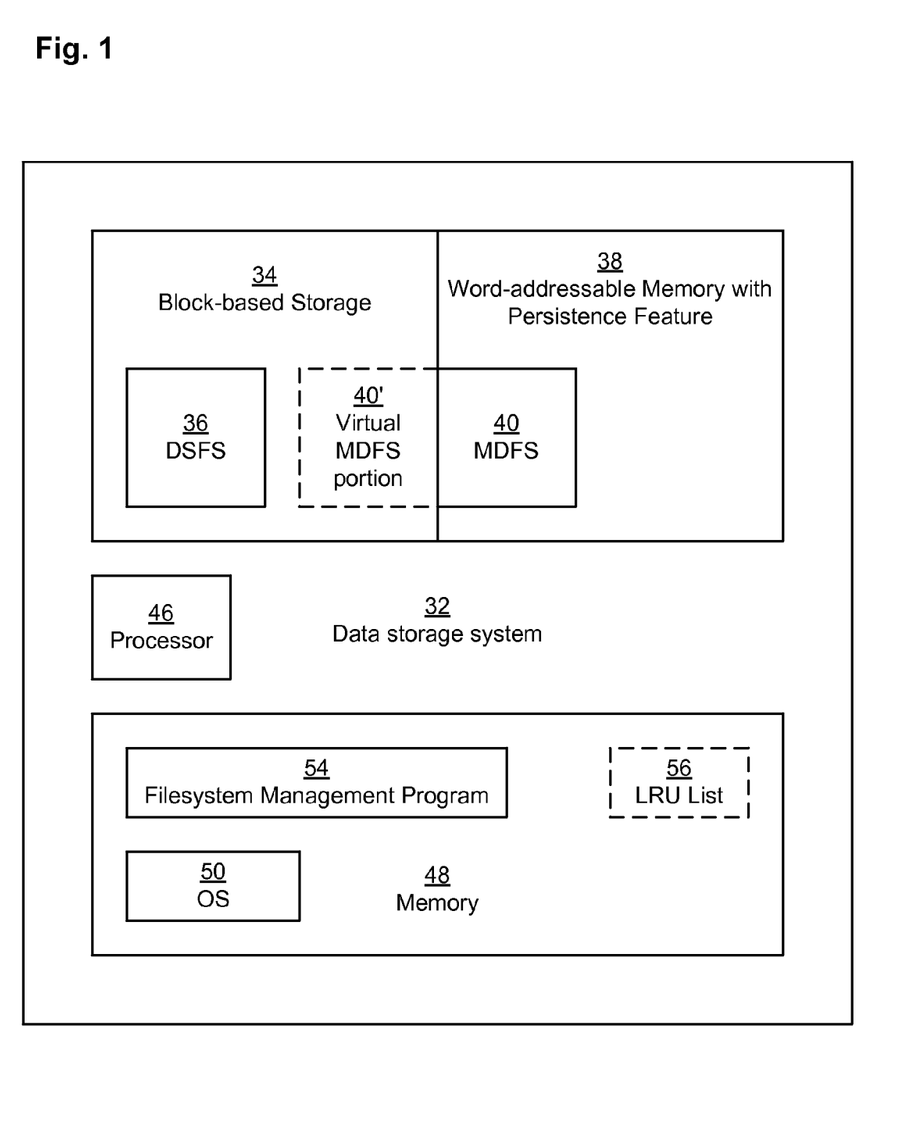
FIG. 1 depicts an example apparatus according to various embodiments.

FIG. 1 depicts an example data storage system 32, such as, for example, a NAS data storage system, which provides access to one or more filesystems stored thereon. Data storage system 32 may be any kind of computing device, such as, for example, a personal computer, a workstation, a server, an enterprise server, a laptop computer, a mobile computer, a smart phone, a tablet computer, etc., but it will typically be a server or enterprise server, such as a VNX series or VNXe series data storage system provided by the EMC Corp. of Hopkinton, Mass.

Data storage system 32 includes block-based storage 34, which stores filesystem data in the context of a data storage file system (DSFS). Block-based storage 34 may take various forms, but it is typically formed from one or more persistent storage devices, such as hard disk drives and solid-state storage devices (SSDs) connected either by an internal bus or via a network (e.g., a storage area network). Block-based storage 34 may be arranged in a fault tolerant arrangement, such as in a redundant array of independent disks (RAID), as is well-known in the art.

Data storage system 32 also includes a WAM with a persistence feature 38. The WAM with persistence feature may take several different forms (described in further detail throughout), but, in all embodiments, the WAM with persistence feature 38 includes at least some random access memory (RAM), which is addressable at a word-level, allowing an individual byte or other small unit of data (e.g., 16 bits) to be accessed and quickly rewritten individually. WAM with persistence feature 38 also includes a persistence feature, which ensures that its contents, even including the contents of the RAM, persist across system restarts. WAM with persistence feature 38 stores at least a portion of the metadata of a metadata file system (MDFS) associated with the DSFS 36 from the block-based storage 34.

Data storage system 32 also includes a processor 46 and memory 48. Processor 46 may be any kind of processor or set of processors configured to perform operations, such as, for example, a microprocessor, a multi-core microprocessor, a digital signal processor, a collection of electronic circuits, or any combination of the above.

Memory 48 may be any kind of digital system memory, such as, for example, RAM. In some embodiments, the RAM portion of WAM with persistence feature 38 may be drawn from memory 48, while, in other embodiments, memory 48 is entirely physically separate from the RAM of the WAM with persistence feature 38.

Memory 48 stores programs executing on processor 46 as well as data used by those programs. Memory 48 stores an operating system (OS) 50, and a filesystem management program 54, both of which run on processor 46. Memory 48 may include both a system memory portion for storing programs and data in active use by the processor 46 as well as a persistent storage portion (e.g., solid-state storage and/or disk-based storage) for storing programs and data even while the data storage system 32 is powered off. However, in some embodiments, persistent storage portion may be included within block-based storage 34. OS 50 and filesystem management program 54 are typically stored both in system memory and in persistent storage so that they may be loaded into system memory from persistent storage upon a system restart. Filesystem management program 54, when stored in non-transient form either in system memory or in persistent storage, forms a computer program product. The processor 46 running the filesystem management program 54 thus forms a specialized circuit constructed and arranged to carry out the various processes described herein.

In some embodiments, memory 48 also stores a least-recently-used (LRU) list 56, which lists references to memory pages in order from least-recently accessed to most-recently accessed, as will be described in further detail below, in connection with FIG. 4.

Figure 2:
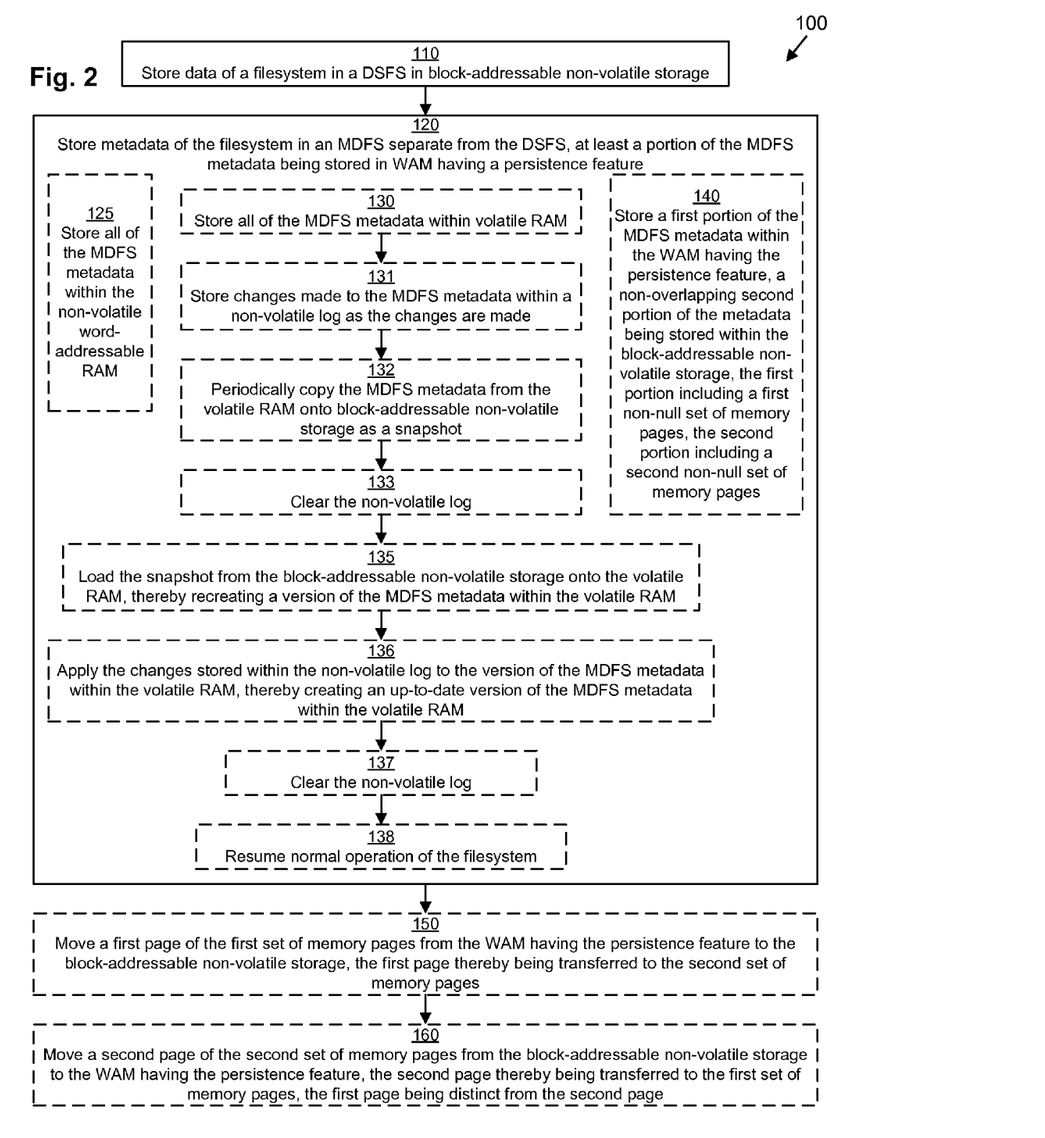
FIG. 2 depicts various example methods according to various embodiments.

FIG. 2 illustrates the operation of data storage system 32 in detail according to various embodiments. It should be understood that any time a piece of software, such as, for example, filesystem management program 54, is described as performing a method, process, step, or function, in actuality what is meant is that the computing device (e.g., data storage system 32) on which that piece of software is running performs the method, process, step, or function when executing that piece of software on its processor (e.g., processor 46). It should also be understood that, in some embodiments, instead of processor 46 executing code of filesystem management program 54, specialized circuitry of the data storage system 32 operates to perform the method, process, step, or function directly in hardware.

FIG. 2 illustrates, as method 100, the operation of filesystem management program 54 on data storage system 32. In step 110, filesystem management program 54 stores data of a filesystem in a DSFS 36 on block-based storage 34.

In step 120, filesystem management program 54 stores metadata of the filesystem in an MDFS 40 on WAM with persistence feature 38. There are several ways this can be done.

In some embodiments, WAM with persistence feature 38 is entirely non-volatile word-addressable RAM, such as, for example, battery-backed RAM, ferroelectric RAM, magnetoresistive RAM, phase-change RAM, non-volatile static RAM, vaulted RAM, and Nano RAM. In these embodiments, step 120 may be performed with reference to sub-step 125. In sub-step 125, filesystem management program 54 stores all the metadata of the filesystem in the non-volatile word-addressable RAM of the WAM with persistence feature 38. Thus, performance may be optimized, since, in order to modify a word of the metadata stored within the non-volatile word-addressable RAM, it is not necessary to also load or otherwise access an adjacent word within the non-volatile word-addressable RAM. This provides a benefit over a conventional arrangement in which an entire block surrounding the word that is desired to be modified must be loaded prior to modifying the word and then the entire block is written back to storage. Thus, the latency of a metadata modification is greatly reduced over a conventional system. In some of these embodiments, the metadata in the MDFS 40 may be arranged in a format better suited to word-addressability than used for conventional metadata. Thus, for example, while in conventional metadata, inodes and directory entries may be arranged in a contiguous array, in some embodiments the inodes and directory entries may be arranged in a pointer-linked chain, allowing different inodes and directory entries to be added at any time wherever there is space without necessarily being contiguous with previous inodes and directory entries.

Figure 3:
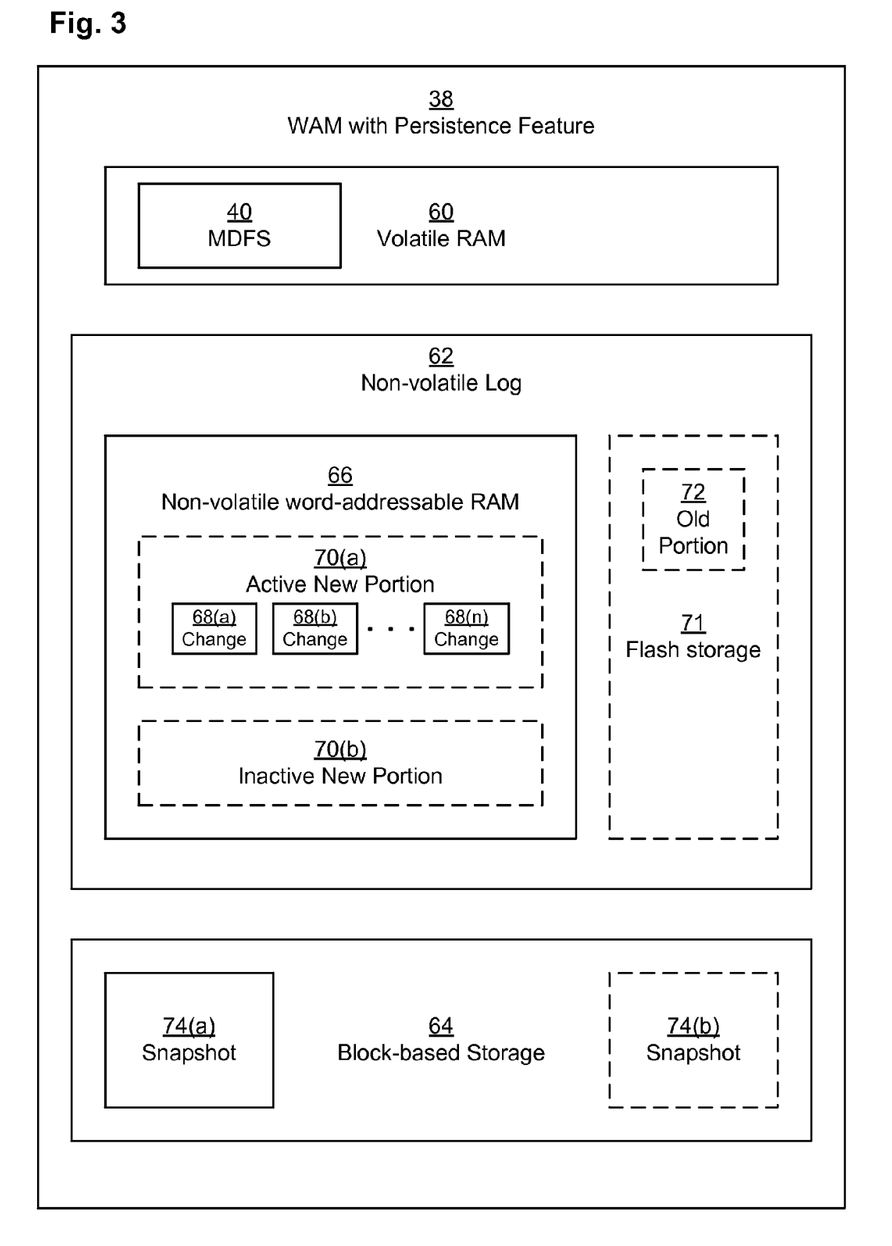
FIG. 3 depicts various example configurations of a word-addressable memory (WAM) having a persistence feature according to various embodiments.

In other embodiments, step 120 may be performed in a different manner. For example, in some embodiments (e.g., in connection with an arrangement as depicted in FIG. 3), step 120 may include one or more of sub-steps 130-138. As another example, in some embodiments (e.g., in connection with an arrangement as depicted in FIG. 4), step 120 may include sub-step 140. Further details of these sub-steps will be provided below, in connection with FIGS. 3 and 4.

Figure 4:
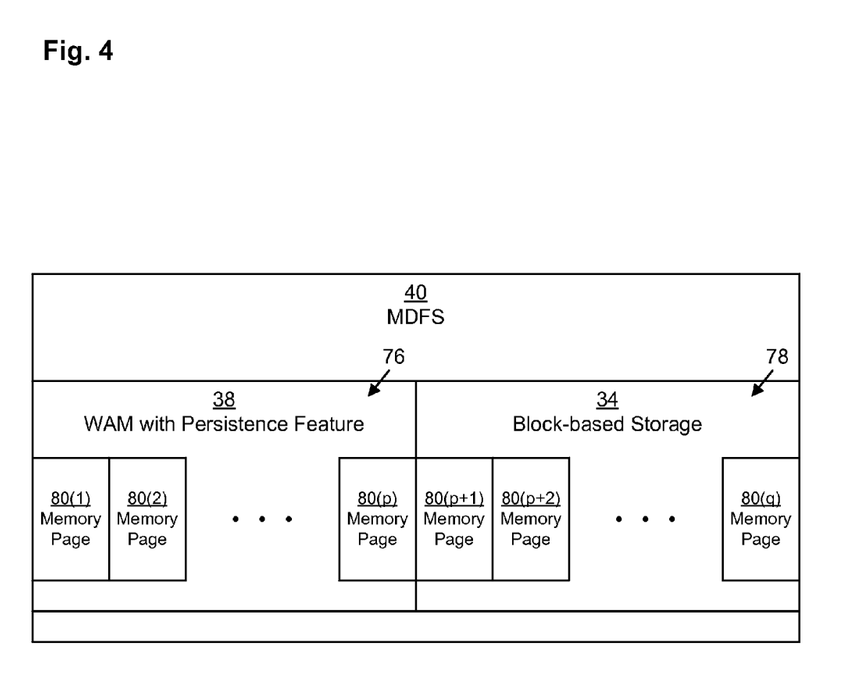
FIG. 4 depicts an example configuration of a metadata filesystem according to various embodiments.

Steps 150 and 160 are optional steps, which are typically only performed in connection with embodiments such as depicted in FIG. 4. Further details of these steps will be provided below, in connection with FIG. 4.

FIG. 3 illustrates an example arrangement of WAM with persistence feature 38 according to various embodiments. In these embodiments, WAM with persistence feature 38 includes volatile RAM 60, non-volatile log 62, and block-based storage 64.

Volatile RAM 60 stores the MDFS 40 metadata. Typically (except as described below in connection with an embodiment which combines the embodiments of FIGS. 3 and 4), volatile RAM 60 stores all of the metadata of the filesystem within MDFS 40. Periodically, filesystem management program 54 backs up the contents of the MDFS 40 metadata onto block-based storage 64 by taking a snapshot 74(a) of the metadata in MDFS 40 and storing the snapshot 74(a) on block-based-storage 64 in order to persist the metadata in MDFS 40. However, since snapshots are only taken periodically, in order to persist the metadata of the MDFS 40 in an up-to-date state, all changes made to the metadata in MDFS 40 are written to non-volatile log 62 as the changes are made. Non-volatile log 62 includes at least some non-volatile word-addressable RAM 66 (e.g., battery-backed RAM, ferroelectric RAM, magnetoresistive RAM, phase-change RAM, non-volatile static RAM, vaulted RAM, or Nano RAM), allowing changes 68 to be quickly stored to the non-volatile log 62 quickly, by allowing the changes 68 to be stored on a word-by-word basis without needing to access an entire block at a time.

In some embodiments, non-volatile log is entirely non-volatile word-addressable RAM 66, while in other embodiments, only a small amount of non-volatile log 62 is non-volatile word-addressable RAM 66, the remainder being flash storage 71 (or, in some embodiments, any kind of block-based storage).

When both non-volatile word-addressable RAM 66 and flash storage 68 are used as parts of non-volatile log 62, changes 68 are first written to a new portion 70(a) of non-volatile word-addressable RAM 66, new portion 70(a) having a size equal to the block size of the flash storage 71 (e.g., 512 bytes or 4,096 bytes) or an integer multiple thereof. This allows changes 68 to be quickly recorded to non-volatile word-addressable RAM 66 at a word level, having low latency. Then, once the new portion 70(*a*) has been filled, it can be written to flash storage 71 (as part of old portion 72) in an optimal way, since an entire block or set of blocks of flash storage 68 is written at once. In some embodiments, an non-volatile word-addressable RAM 66 includes both an active new portion 70(*a*) and an inactive new portion 70(*b*), each of which has a size equal to the block size of the flash storage 68 or am integer multiplier thereof. Thus, once active new portion 70(*a*) has been filled, it may be re-designated as inactive, inactive portion 70(*b*) being re-designated as active. Thus, as portion 70(*a*) is being written to flash storage 71, changes 68 can continue to be written to portion 70(*b*) (which is now active).

Snapshot operations onto block-based storage may be slow, particularly if the MDFS 40 is large and particularly if block-based storage 64 is disk-based. Therefore, in order to prevent data loss in the event that power is lost during a snapshot operation, block-based storage 64 may also store a second snapshot 74(*b*). Thus, while MDFS 40 is in the process of being backed up into snapshot 74(*a*), a previous snapshot 74(*b*) is considered "active" until the snapshotting process is complete, at which point snapshot 74(*a*) may be considered active, while snapshot 74(*b*) may be cleared and considered inactive.

In some embodiments of the arrangement of FIG. 3, the metadata in the MDFS 40 may be arranged in a format better suited to word-addressability than used for conventional metadata. Thus, for example, while in conventional metadata, inodes and directory entries may be arranged in a contiguous array, in some embodiments of the improved technique, the inodes and directory entries may be arranged in a pointer-linked chain, allowing different inodes and directory entries to be added at any time wherever there is space without necessarily being contiguous with previous inodes and directory entries.

The example WAM with persistence feature 38 as depicted in FIG. 3 may be operated in conjunction with embodiments in which sub-steps 130-138 are performed as part of step 120 of method 100.

In sub-step 130, filesystem management program 54 stores all of the metadata of the filesystem (in MDFS 40) within volatile RAM 60. In sub-step 131, filesystem management program 54 stores changes 68 made to the metadata of the filesystem in non-volatile log 62 as the changes are made. To be precise, filesystem management program 54 actually stores descriptors of changes 68 made to the metadata within non-volatile log 62 as the changes 68 are made; however, for brevity, the descriptors of the changes will be used synonymously with the term changes throughout this document.

In some embodiments, step 131 involves physical logging, while, in other embodiments, step 131 involves logical logging. In physical logging, all changes 68 are recorded by recording a changed address within MDFS 40 as well as the new value to be stored within the word at that address. In logical logging, however, each change 68(*x*) is a logical description of a modification to be made to the metadata of MDFS 40, without necessarily referring to physical addresses and values. Thus, for example, in logical logging, change 68(*x*) may be an instruction to "delete directory y," while in physical logging, the same change would require several different changes 68 to separately indicate the removal of directory y from the directory entry of the patent directory of directory y as well as the removal of the directory entry of directory y. Thus, logical logging may be more concise, allowing for faster logging. In physical logging, since certain logical operations may map to several physical operations, logical operation boundaries should be marked to avoid partial application of logical operations that may cause filesystem inconsistencies.

In embodiments in which non-volatile log 62 is entirely non-volatile word-addressable RAM 66, step 131 involves merely writing the changes 68 to the non-volatile word-addressable RAM 66. However, in embodiments in which flash storage 71 is used to store an old portion 72 of the non-volatile log 62, once active new portion 70(*a*) has been filled, it is written to old portion 72 (and inactive new portion 70(*b*) may be swapped with 70(*a*) to become active)

In sub-step 132, filesystem management program 54 periodically (e.g., once every second, minute, hour, or day, etc.) copies metadata in MDFS 40 from volatile RAM 60 to a snapshot 74 of block-based storage. Depending on how many snapshots 74 are being used, sub-step 132 may involve swapping active status between snapshots 74(*a*) and 74(*b*).

In sub-step 133, upon successfully completing a snapshotting operation, filesystem management program 54 clears non-volatile log 62, since the current snapshot 74 is based on the metadata with the changes 68 already applied to it. If the snapshotting operation takes a long time, various steps may need to be taken to deal with new changes 68 being made during the snapshotting process. Thus, during the snapshotting process, MDFS 40 may be locked to prevent any changes 68 from being made until the process is over. Alternatively, changes 68 made during the snapshotting process may be made to a special area of the non-volatile log 62 (e.g., inactive new portion 70(*b*)) that is not cleared upon the completion of the snapshotting process.

Sub-steps 130-133 may be performed repeatedly to ensure that the metadata in the MDFS 40 is properly persisted. If, at some point, power is lost or, for some other reason the metadata in the MDFS 40 within volatile RAM 60 is irrecoverable, then sub-steps 135-138 may be performed to regenerate the metadata in the MDFS 40 within volatile RAM 60.

In sub-step 135, filesystem management program 54 loads the active snapshot 74(*a*) from the block-based storage 64 into the volatile RAM 60, thereby recreating a version of the MDFS 40 metadata within the volatile RAM 60. In sub-step 136, filesystem management program 54 applies the changes 68 stored within the non-volatile log 62 to the version of the MDFS 40 metadata recreated within volatile RAM 60, thereby recreating an up-to-date version of the MDFS 40 metadata within the volatile RAM 60.

In sub-step 137, once the MDFS 40 metadata has been fully recreated within volatile RAM 60 in the most up-to-date fashion, filesystem management program 54 clears the non-volatile log 137. Then, in sub-step 138, filesystem management program 54 resumes normal operation of the data storage system 32, allowing read and write operations to be performed on the filesystem, since the metadata in the MDFS 40 is now up-to-date.

FIG. 4 illustrates an example arrangement of metadata in MDFS 40 according to various embodiments. In these embodiments, the metadata in MDFS 40 is spread across both the WAM with persistence feature 38 and the block-based storage 34. The metadata in MDFS 40 is stored using a virtual memory addressing space having up to q pages. Up top (p<q) memory pages 80(1), 80(2), ..., 80(*p*) are stored within WAM with persistence feature 38, while the remaining q-p (q minus p) memory pages 80(*p*+1), 80(*p*+2), ..., 80(*q*) are stored within block-based storage 34. Thus, the metadata in MDFS 40 is logically divided into two non-overlapping portions, a paged-in portion 76 and a paged-out portion 78. This allows the WAM with persistence feature 38 to be considerably smaller than the maximum possible size of the metadata in the MDFS 40. Metadata that is in active use by the data storage system 32 (e.g., because the DSFS 36 data that it describes is being accessed) may be stored in the paged-in portion 76, while some amount of the metadata that is not in active use by the data storage system 32 may be stored in the paged-out portion 78. The size of the memory pages 80 may vary from arrangement to arrangement, but a size of 32 kilobytes is typical. Each memory page 80(z) is designed to store only metadata of a certain type. Thus, one memory page 80(i) may store inodes, while another memory page 80(j) may store directory entries.

In some embodiments, the WAM with persistence feature 38 used to store paged-in portion 76 may be entirely non-volatile word-addressable RAM (e.g., battery-backed RAM, ferroelectric RAM, magnetoresistive RAM, phase-change RAM, non-volatile static RAM, vaulted RAM, or Nano RAM). In other embodiments, the WAM with persistence feature 38 used to store paged-in portion 76 may be a snap-shotted and logged memory structure as depicted in FIG. 3.

The example arrangement of metadata in MDFS 40 as depicted in FIG. 4 may be operated in conjunction with embodiments in which sub-step 140 is performed as part of step 120 and steps 150-160 are performed as parts of method 100.

In sub-step 140, filesystem management program 54 stores the paged-in portion 76 of the metadata within the WAM with persistence feature 38, while paged-out portion 78 of the metadata is stored within block-based storage 34. In embodiments in which the WAM with persistence feature 38 is a snapshotted and logged memory structure as depicted in FIG. 3, paged-in portion 76 is stored entirely within volatile RAM 60 of the WAM with persistence feature 38, while paged-in portion 76 is also periodically snapshotted to snapshots 74 of block-based storage 64 and changes 68 are logged to non-volatile log 62, as described previously.

In step 150, as metadata from memory pages 80 of the paged-out portion 78 are needed (e.g., if a new file is accessed that had not been accessed recently), filesystem management program 54 transfers the relevant memory pages 80 to the paged-in portion 76 in WAM with persistence feature 38.

In step 160, in order to make room for the new memory pages 80 in the WAM with persistence feature 38, filesystem management program 54 transfers other memory pages 80 from the paged-in portion 76 to the paged-out portion 78 in block-based storage 34. In some embodiments, the particular memory pages 80 that are transferred from the paged-in portion 76 to the paged-out portion 78 are the memory pages 80 that have been least-recently accessed. In some embodiments, LRU list 56 may be used to make this determination, while, in other embodiments, other well-known techniques may be used to choose a memory page 80 which has not been recently used.

Thus, techniques have been described for storing at least a portion of filesystem metadata on WAM having a persistence feature 38 to allow for high speed access while also surviving system restarts.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transient computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method of operating a data storage system having a filesystem, the data storage system being configured to efficiently process received read and write commands directed at the filesystem, the method comprising:
    storing data of the filesystem in a data storage filesystem (DSFS) in block-addressable non-volatile storage;
    storing metadata of the filesystem in a metadata filesystem (MDFS) separate from the DSFS, at least a portion of the metadata being stored in word-addressable memory (WAM) having a persistence feature, wherein storing the metadata of the filesystem in the MDFS separate from the DSFS, at least a portion of the metadata being stored in WAM having the persistence feature includes:
        storing all of the metadata of the filesystem within volatile random access memory (RAM);
        storing descriptors of changes made to the metadata within a non-volatile log as the changes are made;
        periodically copying the metadata from the volatile RAM onto block-addressable non-volatile storage as a snapshot; and
        upon copying the metadata from the volatile RAM onto block-addressable non-volatile storage as the snapshot, clearing the non-volatile log; and
    upon a system failure:
        loading the snapshot from the block-addressable non-volatile storage onto the volatile RAM, thereby recreating a version of the MDFS within the volatile RAM;
        applying the changes stored within the non-volatile log to the version of the MDFS within the volatile RAM, thereby creating an up-to-date version of the MDFS within the volatile RAM; and
        subsequent to creating the up-to-date version of the MDFS within the volatile RAM:
            clearing the non-volatile log; and
            resuming normal operation of the filesystem.

2. The method of claim 1, wherein periodically copying the metadata from the volatile RAM onto the block-addressable non-volatile storage as a snapshot includes:
    performing a copy operation to copy the metadata from the volatile RAM onto block-addressable non-volatile storage as an inactive snapshot; and
    upon completing the copy operation, designating the inactive snapshot as an active snapshot and designating a previous active snapshot as inactive.

3. The method of claim 1, wherein storing the descriptors of the changes made to the metadata within the non-volatile log includes storing the descriptors within a non-volatile word-addressable RAM.

4. The method of claim 1, wherein storing the descriptors includes storing, as part of each descriptor:
 a reference to a particular address of the MDFS that corresponds to the changed metadata; and
 a value to be stored at the particular address.

5. The method of claim 1, wherein storing the descriptors includes storing, as part of each descriptors, a logical instruction indicating how to modify the MDFS.

6. The method of claim 1, wherein storing the metadata includes arranging a set of entries in a pointer-linked chain within the WAM having the persistence feature.

7. The method of claim 1, wherein the method further comprises modifying a first word of the metadata stored within the portion of the metadata stored in WAM having the persistence feature, the first word being stored at an address within the WAM having the persistence feature immediately after a second word and immediately before a third word, wherein modifying the first word includes directly accessing the first word within the WAM having the persistence feature without accessing the second word and without accessing the third word.

8. The method of claim 1 wherein the method further comprises performing read and write operations on the filesystem.

9. A method of operating a data storage system having a filesystem, the data storage system being configured to efficiently process received read and write commands directed at the filesystem, the method comprising:
 storing data of the filesystem in a data storage filesystem (DSFS) in block-addressable non-volatile storage; and
 storing metadata of the filesystem in a metadata filesystem (MDFS) separate from the DSFS, at least a portion of the metadata being stored in word-addressable memory (WAM) having a persistence feature, wherein storing the metadata of the filesystem in the MDFS separate from the DSFS, at least a portion of the metadata being stored in WAM having the persistence feature includes:
  storing all of the metadata of the filesystem within volatile random access memory (RAM);
  storing descriptors of changes made to the metadata within a non-volatile log as the changes are made;
  periodically copying the metadata from the volatile RAM onto block-addressable non-volatile storage as a snapshot; and
  upon copying the metadata from the volatile RAM onto block-addressable non-volatile storage as the snapshot, clearing the non-volatile log;
 wherein:
  the non-volatile log includes a new portion and an old portion, the new portion being stored within a non-volatile word-addressable RAM and the old portion being stored within block-addressable storage having a fixed block size; and
  storing the descriptors of the changes made to the metadata within the non-volatile log as the changes are made includes:
   as the changes are made, storing the descriptors to the new portion within the non-volatile word-addressable RAM using word-level storage operations; and
   upon the new portion reaching the fixed block size:
    copying the descriptors stored within the new portion to an empty block of the old portion on the block-addressable flash storage; and
    clearing the contents of the new portion.

10. The method of claim 9, wherein:
 the non-volatile word-addressable RAM has a size at least twice the fixed block size, the non-volatile word-addressable RAM having a first portion and a second portion, the first portion and the second portion not overlapping, the first portion and the second portion each having a size equal to an integer multiple of the fixed block size, exactly one of the first portion and the second portion being designated as an active portion at any given time, the other being designated the inactive portion;
 storing the descriptors to the new portion within the non-volatile word-addressable RAM using word-level storage operations as the changes are made includes storing the descriptors to the active portion; and
 copying the descriptors stored within the new portion to the empty block of the old portion on the block-addressable storage includes:
  swapping the designations of the active portion and the inactive portion;
  after swapping, performing a copy operation to copy the descriptors stored within the inactive portion to the empty block of the old portion on the block-addressable storage;
  while performing the copy operation, continuing to store new descriptors of changes as new changes are made to the active portion; and
  upon completing the copy operation, clearing the inactive portion.

11. A method of operating a data storage system having a filesystem, the data storage system being configured to efficiently process received read and write commands directed at the filesystem, the method comprising:
 storing data of the filesystem in a data storage filesystem (DSFS) in block-addressable non-volatile storage;
 storing metadata of the filesystem in a metadata filesystem (MDFS) separate from the DSFS, at least a portion of the metadata being stored in word-addressable memory (WAM) having a persistence feature, wherein storing the metadata of the filesystem in the MDFS separate from the DSFS includes storing a first portion of the metadata within the WAM having the persistence feature, a non-overlapping second portion of the metadata being stored within the block-addressable non-volatile storage, the first portion including a first non-null set of memory pages, the second portion including a second non-null set of memory pages;
 moving a first page of the first set of memory pages from the WAM having the persistence feature to the block-addressable non-volatile storage, the first page thereby being transferred to the second set of memory pages; and
 in response to moving the first page of the first set of memory pages, moving a second page of the second set of memory pages from the block-addressable non-volatile storage to the WAM having the persistence feature, the second page thereby being transferred to the first set of memory pages, the first page being distinct from the second page.

12. The method of claim 11, wherein storing the first portion of the metadata within the WAM having the persistence feature includes storing the first portion of the metadata within a non-volatile word-addressable random access memory.

13. The method of claim 11, wherein storing the metadata of the filesystem in the MDFS separate from the DSFS further includes:
  storing the first portion within volatile random access memory (RAM);
  storing descriptors of changes made to the first portion within a non-volatile log as the changes are made;
  periodically copying the first portion from the volatile RAM onto block-addressable non-volatile storage as a snapshot; and
  upon copying the first portion from the volatile RAM onto block-addressable non-volatile storage as the snapshot, clearing the non-volatile log.

14. A data storage system apparatus configured to efficiently process received read and write commands directed at a filesystem of the data storage system apparatus, the data storage system apparatus comprising:
  block-addressable non-volatile storage;
  a word-addressable memory (WAM) having a persistence feature; and
  a processor, the processor being configured to operate the filesystem by:
    storing data of the filesystem in a data storage filesystem (DSFS) in the block-addressable non-volatile storage; and
    storing metadata of the filesystem in a metadata filesystem (MDFS) separate from the DSFS, at least a portion of the metadata being stored in the WAM having the persistence feature;
  wherein:
    the WAM having the persistence feature includes:
      volatile random access memory (RAM);
      a non-volatile log; and
      an area of block-addressable non-volatile storage, the area of block-addressable non-volatile storage including a snapshot storage area;
    storing the metadata of the filesystem in the MDFS separate from the DSFS, at least a portion of the metadata being stored in the WAM having the persistence feature includes:
      storing all of the of the metadata of the filesystem within the volatile RAM;
      storing descriptors of changes made to the metadata within the non-volatile log as the changes are made;
      periodically copying the metadata from the volatile RAM into the snapshot storage area of the block-addressable non-volatile storage as a snapshot; and
      upon copying the metadata from the volatile RAM onto the snapshot storage area, clearing the non-volatile log; and
    the processor is further configured to operate the filesystem by, upon a system failure:
      loading the snapshot from the block-addressable non-volatile storage onto the volatile RAM, thereby recreating a version of the MDFS within the volatile RAM;
      applying the changes stored within the non-volatile log to the version of the MDFS within the volatile RAM, thereby creating an up-to-date version of the MDFS within the volatile RAM; and
      subsequent to creating the up-to-date version of the MDFS within the volatile RAM:
        clearing the non-volatile log; and
        resuming normal operation of the filesystem.

15. The apparatus of claim 14, wherein the non-volatile log is stored within a non-volatile word-addressable RAM.

16. The apparatus of claim 15, wherein the non-volatile word-addressable RAM is a memory selected from the following types of memory:
  battery-backed RAM;
  ferroelectric RAM;
  magnetoresistive RAM;
  non-volatile static RAM;
  vaulted RAM; and
  Nano RAM.

17. The apparatus of claim 14, wherein
  the non-volatile log includes a new portion and an old portion, the new portion being stored within a non-volatile word-addressable RAM and the old portion being stored within block-addressable storage having a fixed block size; and
  storing the descriptors of the changes made to the metadata within the non-volatile log as the changes are made includes:
    as the changes are made, storing the descriptors to the new portion within the non-volatile word-addressable RAM using word-level storage operations; and
    upon the new portion reaching the fixed block size:
      copying the descriptors stored within the new portion to an empty block of the old portion on the block-addressable flash storage; and
      clearing the contents of the new portion.

18. A computer program product comprising a non-transitory computer-readable storage medium storing a set of instructions, which, when executed by a data storage system configured to efficiently process received read and write commands directed at a filesystem of the data storage system, cause the data storage system to operate the filesystem by:
  storing data of the filesystem in a data storage filesystem (DSFS) in block-addressable non-volatile storage;
  storing metadata of the filesystem in a metadata filesystem (MDFS) separate from the DSFS, at least a portion of the metadata being stored in word-addressable memory (WAM) having a persistence feature, wherein storing the metadata of the filesystem in the MDFS separate from the DSFS, at least a portion of the metadata being stored in WAM having the persistence feature includes:
    storing all of the metadata of the filesystem within volatile random access memory (RAM);
    storing descriptors of changes made to the metadata within a non-volatile log as the changes are made;
    periodically copying the metadata from the volatile RAM onto block-addressable non-volatile storage as a snapshot; and
    upon copying the metadata from the volatile RAM onto block-addressable non-volatile storage as the snapshot, clearing the non-volatile log; and
  upon a system failure:
    loading the snapshot from the block-addressable non-volatile storage onto the volatile RAM, thereby recreating a version of the MDFS within the volatile RAM;
    applying the changes stored within the non-volatile log to the version of the MDFS within the volatile RAM, thereby creating an up-to-date version of the MDFS within the volatile RAM; and
    subsequent to creating the up-to-date version of the MDFS within the volatile RAM:
      clearing the non-volatile log; and
      resuming normal operation of the filesystem.

19. The computer program product of claim 18 wherein:
  the non-volatile log includes a new portion and an old portion, the new portion being stored within a non-volatile word-addressable RAM and the old portion being stored within block-addressable storage having a fixed block size; and storing the descriptors of the changes made to the metadata within the non-volatile log as the changes are made includes:

as the changes are made, storing the descriptors to the new portion within the non-volatile word-addressable RAM using word-level storage operations; and upon the new portion reaching the fixed block size:

copying the descriptors stored within the new portion to an empty block of the old portion on the block-addressable flash storage; and clearing the contents of the new portion.

* * * * *